US006600869B1

United States Patent
Chen et al.

(10) Patent No.: US 6,600,869 B1
(45) Date of Patent: Jul. 29, 2003

(54) METHOD AND APPARATUS TO EDIT DIGITAL VIDEO DATA

(75) Inventors: George K. Chen, Portland, OR (US); Atul Gupta, Portland, OR (US); Michael Keith, Salem, OR (US); Jeffrey S. McVeigh, Portland, OR (US); Stephen V. Wood, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/120,646

(22) Filed: Jul. 22, 1998

(51) Int. Cl.[7] .............................. H04N 5/93; H04N 27/00
(52) U.S. Cl. ............................................. 386/52; 386/55
(58) Field of Search ...................... 386/52, 55, 107, 386/117, 4, 1, 46, 109, 111, 112, 27, 33, 38, 40, 124, 131; 360/13; 345/723; H04N 5/93, 27/00

(56) References Cited

U.S. PATENT DOCUMENTS 5,153,730 A * 10/1992 Nagasaki et al.
5,477,264 A * 12/1995 Sarbadhikari et al.
5,568,275 A * 10/1996 Norton et al.
5,589,945 A * 12/1996 Abecassis

* cited by examiner

*Primary Examiner*—Robert Chevalier
(74) *Attorney, Agent, or Firm*—Trop, Pruner & Hu, P.C.

(57) ABSTRACT

Digital video (DV) formatted image streams may be converted into an intermediate format having a lower resolution than the original image streams. A user may then edit the intermediate formatted image streams to generate a sequence of edit commands. The edit commands may then be processed to generate an output image stream based on the original image streams. The output image stream may be in any desired format, including DV format. The sequence of edit commands may also be processed to generate a preview image stream in the intermediate format.

32 Claims, 3 Drawing Sheets

METHOD AND APPARATUS TO EDIT DIGITAL VIDEO DATA

BACKGROUND

The invention relates generally to editing digital video streams, or files.

FIG. 1 illustrates how many current digital video cameras generate a digital video formatted (DV) data stream. As light passes though a digital camera's lens it is split into red, green, and blue (RGB) components and sampled by a charge coupled device, CCD (block 100). CCD output signals are digitized by sampling the captured image both horizontally and vertically (block 102). A standard vertical sample rate is 525 lines and a standard horizontal sample rate is 500 pixels per line. At this point, each pixel contains a measurement for the red, green, and blue components of the light that is incident on its corresponding CCD element. Data rates following CCD sampling may be approximately 31 MBps (megabytes per second).

A pixel's RGB values may then be converted to the YUV color space CS (block 104), where Y represents a pixel's brightness, and U and V its color values. Typically, each pixel's Y values are sampled four times, while a pixel's U and V values are sampled twice. The resulting signal is often referred to as a YUV 4:2:2 video signal. Conversion from the RGB to YUV color space in this manner may reduce the video stream's data rate to approximately 20.5 MBps.

The YUV 4:2:2 signal is generally reduced to YUV 4:1:1 to coincide with the National Television Standards Committee (NTSC) video standard (block 106). In this reduced format, a pixel keeps its own unique Y brightness information, but groups of four neighboring pixels share the same U and V color information. Reducing the video signal from YUV 4:2:2 to YUV 4:1:1 is designed to reduce the video signal data rate to approximately 15.5 MBps. Intraframe compression is then applied to generate a digital video signal whose data rate is approximately 3.1 MBps (block 108).

While some DV tools allow a user to edit DV data streams digitally, they are generally slow because they operate on raw DV data streams. At a generation rate of 3.1 MBps, even a relatively short video of an hour requires approximately 11 GB (gigabytes) of storage. Not only do most users not have this much permanent storage, manipulating (i.e., editing) data streams this large on a standard personal computer may be a very slow process. Thus, it would be beneficial to provide a mechanism to edit DV data streams that use less disk space while also increasing editing performance.

SUMMARY

In one embodiment, the invention provides a technique to edit image data. The technique includes receiving image data in a first format, converting the received image data into a second format, editing the received image data in the second format to generate a sequence of edit commands, and generating image data in a third format based on the sequence of edit commands.

DETAILED DESCRIPTION

Methods and devices to edit digital video formatted (DV) image streams are described. Embodiments of the inventive concept may provide improved editing performance through, for example, reduced disk access operations, improved user response times, and lower mass storage requirements than previous techniques. The following embodiments of the inventive concept are illustrative only and are not to be considered limiting in any respect. Methods in accordance with the invention may be stored in any media that is readable and executable by a computer system.

Figure 1:
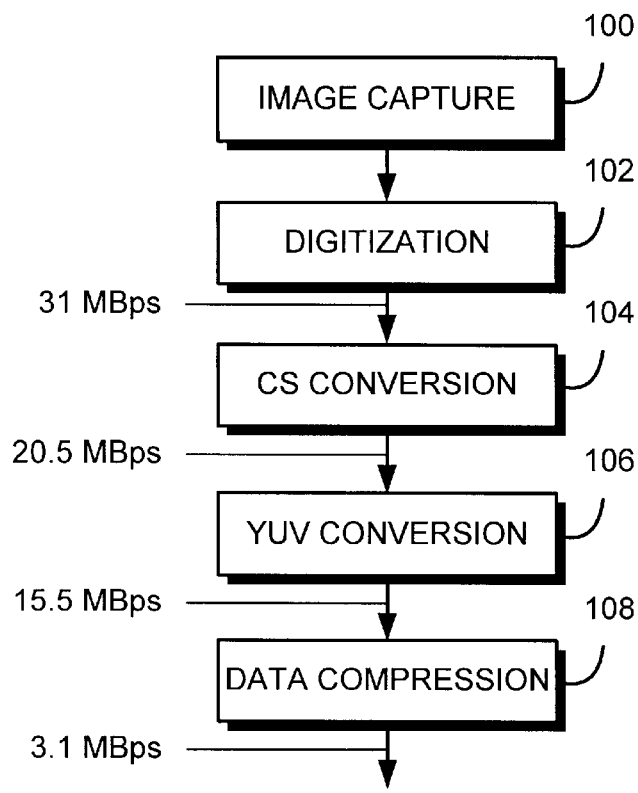
FIG. 1 shows how a typical digital video camera generates an output video stream.
Figure 2:
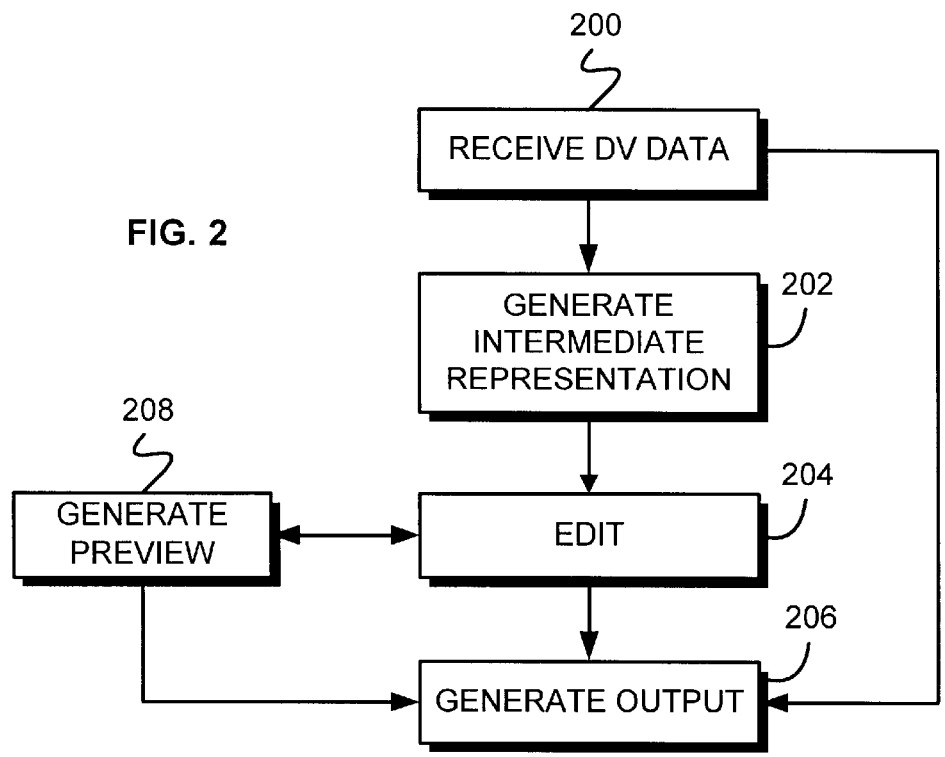
FIG. 2 shows one method in accordance with the invention to edit a digital video formatted (DV) image stream.

Referring to FIG. 2, one embodiment of a method in accordance with the invention includes receiving a DV image stream (block 200) from one or more sources which is then transformed/converted into an intermediate representation (block 202). Typical DV sources include DV camera cassettes and other forms of mass storage such as magnetic and optical disks, which have had previously recorded image streams stored therein. The intermediate format may be any format that provides reduced data density. Illustrative characteristics of a suitable intermediate format include: a high compression ratio (to reduce disk usage during editing); compression during translation (to reduce disk usage during editing); reasonable image quality (to allow user editing of converted image data); fast decode capability (for speed of operation during subsequent editing operations); and a frame-based representation (for convenience of mapping the converted image data to the input image stream). It is noted that not all of these characteristics may be provided by a single intermediate format.

In one embodiment, the intermediate format may be the standard MPEG-1 format. In another embodiment, the intermediate format may be the INDEO 5.0 format from Intel Corporation. A useful characteristic of the INDEO format is that it, like DV itself, comprises a frame based representation. DV camcorder output signals, having a data rate of roughly 3.1 MBps (megabytes per second), converted into INDEO format at one-quarter resolution (320 horizontal lines per frame and 240 pixels per line) provides a representative image useful for editing operations while having a data rate of approximately 340 KBps (kilobytes per second). This represents an approximately 10-fold reduction in data density. This reduced data density may result in dramatically reduced storage requirements for the input image data during editing while also providing faster operations during editing (moving from one image or frame to another image or frame).

Once converted, any application capable of editing an image stream in the chosen intermediate format may be used when modified to generate an edit list (block 204). An edit list is a list of modifications made by a user to the intermediate formatted image streams. For example, if a user wants to generate an output image stream comprising various frames from two input image streams, the order in which the frames from input stream 1 and input stream 2 are to be sequenced in the output stream may be recorded in the edit list.

In the illustrative edit list of Table 1, the first entry specifies that those frames in stream-1 between position 00:00:00:00 and 00:00:30:20 are to be located at frame locations 00:00:00:00 through 00:00:30:20 of the output image stream. (The notation HH:MM:SS:FF signifies a time stamp of HH hours, MM minutes, SS seconds, and frame number FF within the second identified by the value of SS. For example, if 30 frames are captured per second, then FF may take on a value between 00 and 29 inclusive. Of course, the invention is not limited in scope to this aspect.) The second entry specifies that those frames in stream-2 between position 00:00:00:10 and 00:00:10:00 follow those frames indicated in the first entry. Similarly, the third entry specifies that those frames in stream-2 between locations 00:01:15:00 and 00:01:55:07 follow those frames indicated in the second entry.

TABLE 1

An Illustrative Edit List

| Input Stream Identification | Start Position | Stop Position |
| --- | --- | --- |
| Stream-1 | 00:00:00:00 | 00:00:30:20 |
| Stream-2 | 00:00:00:10 | 00:00:10:00 |
| Stream-2 | 00:01:15:00 | 00:01:55:07 |

If after specifying an edit described by the third entry in Table 1, a user decides to insert frames from a third input image stream, beginning at location 00:00:30:20 of the output stream, the edit list may be modified as shown in Table 2.

TABLE 2

A Modified Edit List

| Input Stream Identification | Start Position | Stop Position |
| --- | --- | --- |
| Stream-1 | 00:00:00:00 | 00:00:30:20 |
| Stream-3 | 01:43:12:00 | 01:43:13:17 |
| Stream-2 | 00:00:00:10 | 00:00:10:00 |
| Stream-2 | 00:01:15:00 | 00:01:55:07 |

If, instead of the scenario described in Table 2, a user decides to insert frames from a third input stream into the middle of the frames identified in the first entry of Table 1, the edit list may be modified as shown in Table 3. In Table 3, frames from stream-3 have been inserted into the list of frames identified in the first entry of Table 1 causing that entry to be bifurcated into entry one and three of Table 3.

TABLE 3

Another Modified Edit List

| Input Stream Identification | Start Position | Stop Position |
| --- | --- | --- |
| Stream-1 | 00:00:00:00 | 00:00:15:00 |
| Stream-3 | 00:00:00:00 | 00:00:09:05 |
| Stream-1 | 00:00:15:00 | 00:00:30:20 |
| Stream-2 | 00:00:00:10 | 00:00:10:00 |
| Stream-2 | 00:01:15:00 | 00:01:55:07 |

Conceptually the edit list represents a sequence of instructions or commands which, when performed, transform an input image stream(s) into an output image stream (block 206 in FIG. 2). In one embodiment of the invention, the edit list may be used to automatically generate an output image stream immediately upon the user completing his or her edits. In another embodiment the edit list may be stored on a suitable storage device, and recalled at a later time to automatically generate the output image stream. In yet another embodiment, the edit list may be used to generate an optional preview of the output image stream, albeit in the intermediate format (block 208). In this manner, a user may view the result of their edits before committing them to an output image stream. If the user decides to perform additional edits, she may reenter the editor (return to block 204). The final image stream may be generated if the user decides that the preview warrants (continue at block 206).

If an input data stream is a DV formatted stream, and the target output stream is to be DV formatted, those frames in the input stream which are to be placed into the output stream (without modification or special effects, see discussion below), may be copied directly from the input stream to the output stream. This is indicated in FIG. 2 by the dashed line from block 200 to block 206.

Figure 3:
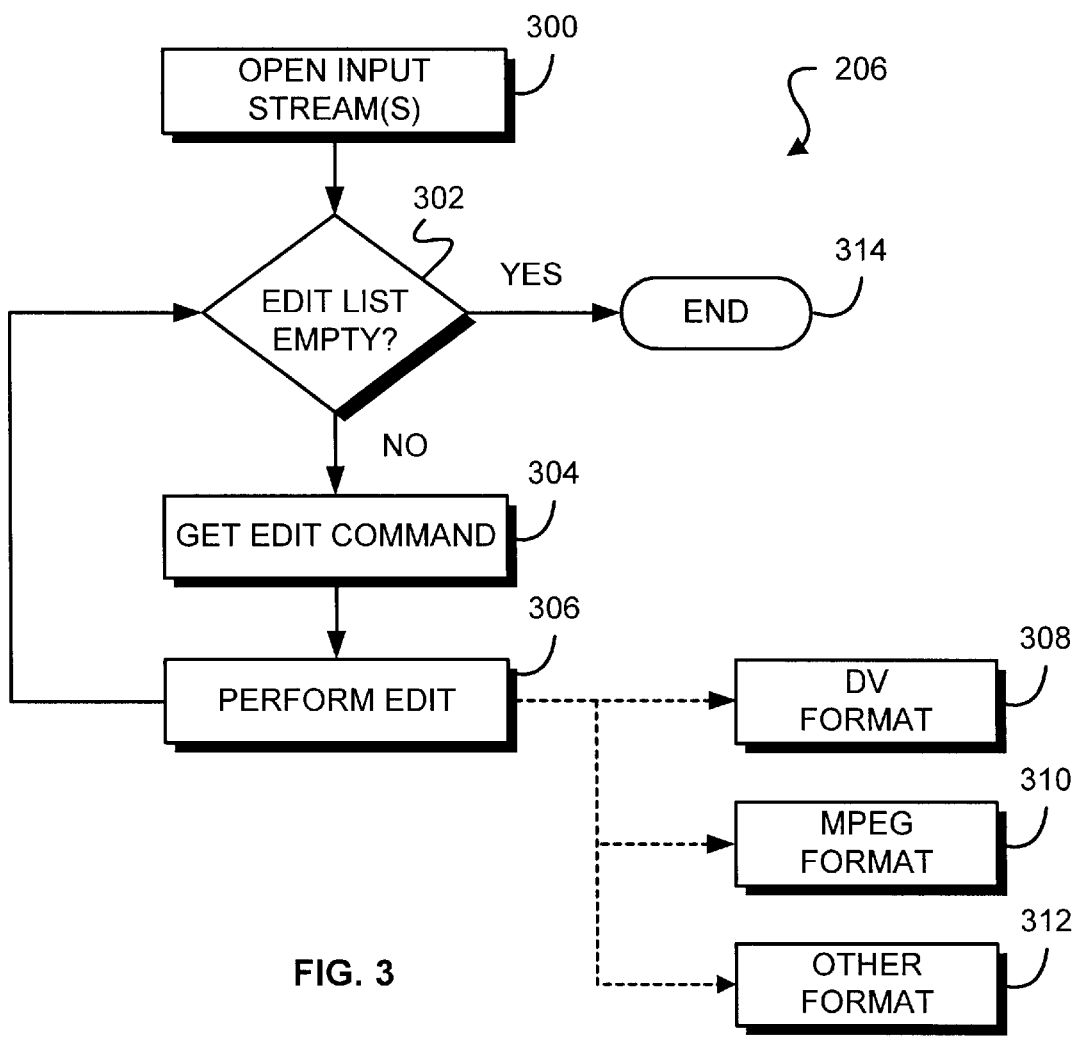
FIG. 3 shows an illustrative edit list processing technique in accordance with one embodiment of the invention.

FIG. 3 shows an illustrative technique to process the contents of an edit list to generate an output image stream (block 206). First, input image streams are identified and opened for subsequent access (block 300). If the edit list is not empty (the 'no' prong of diamond 302), the first edit entry is retrieved from the edit list (block 304), and the specified frames of the specified input image stream are copied to the output stream in a format that may be specified by the user (306). For example, the generated output image stream may conform to the DV format 308, one of the international standard motion picture experts group (MPEG) formats 310, or another format of the user's choice 312. If the format of the output stream is to be the same as that of the input stream (associated with the edit list entry being processed), the identified frames in the input stream may be copied directly to the output stream. On completion of the edit operation (block 306), processing continues at diamond 302 where the next edit command is retrieved (if one exists). If the edit list is empty of edit entries/commands (the 'yes' prong of diamond 302), edit list processing terminates (block 314).

Figure 4:
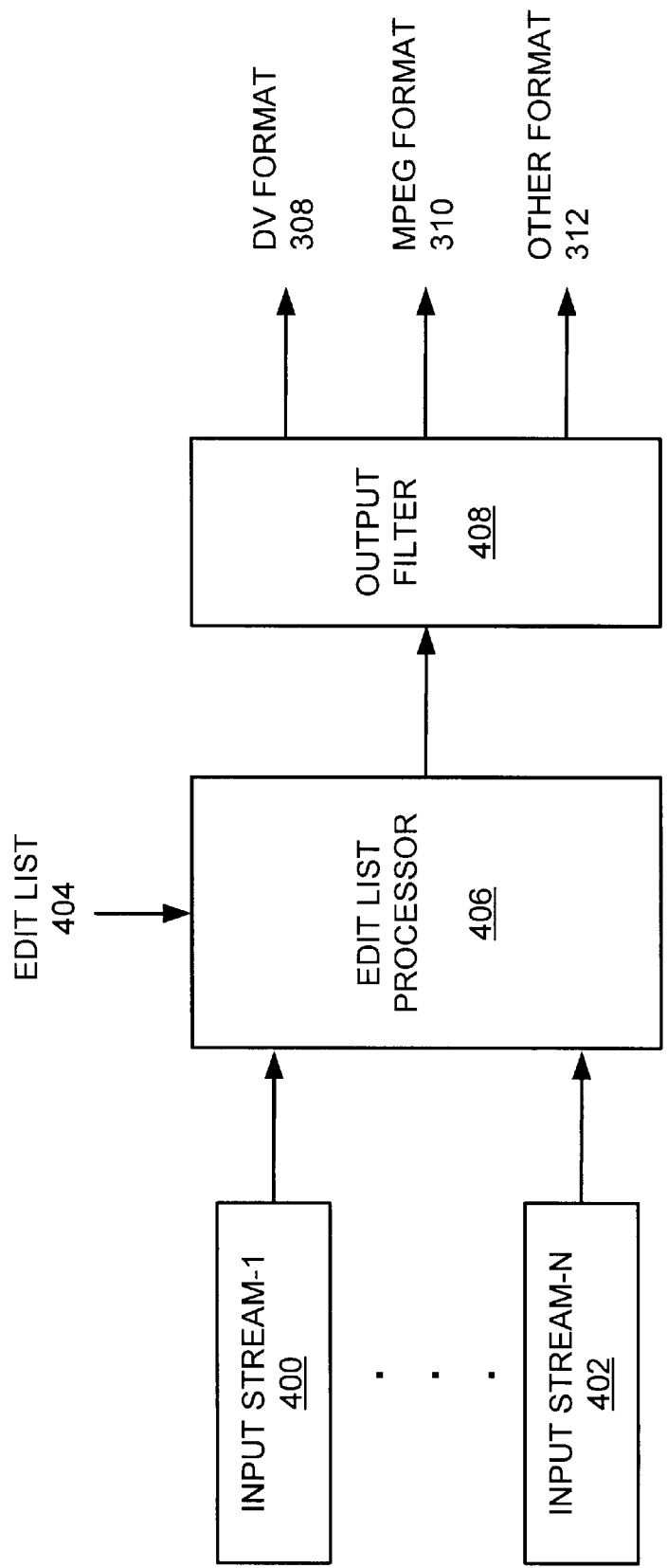
FIG. 4 shows an edit list processor in accordance with one embodiment of the invention.

An illustrative device providing edit list processing capability is shown in FIG. 4. Input image streams 400 and 402 and edit list 404 are input to edit list processor 406. Edit list processor 406 may perform the edits specified in the edit list as described above to generate output signals which may then be filtered 408 to generate one or more output streams in one or more specified formats, e.g., 308, 310, and 312. In one embodiment, edit list processor 406 executes each edit list entry as it is encountered in accordance with FIG. 3.

Embodiments of edit methods in accordance with FIG. 3 are frame level edits in that entire frames are operated upon as individual units (e.g., copied from an input stream to the output stream). It is also possible to provide a user with intraframe level editing capability where a user may make edits/modifications within a single frame. Intraframe editing may be denoted in the edit list by an edit operation tag such as "intraframe" or "special effect." Illustrative known special effects include, but are not limited to: fade operations that take a given stream and transition it to black or from black to a specified stream; dissolve operations which dissolve a first stream into a second stream; clock-wipes which transition from a first stream to a second stream beginning at a specified clock position such as six o'clock; swirl operations which take a single stream and rotate it, fading into the center or other specified point; venetian blind operations that show a first stream when the "blinds" are closed and a second stream when closed; and wipe operations that transition from one stream to another from left-to-right, top-to-bottom, or diagonal-to-diagonal.

Table 4 shows an edit list that includes a 1 second dissolve operation from stream-1 to stream-2 (edit list entries 2 and 3) and a fade (to black) operation on the output stream lasting five seconds (entry 4). As shown in Table 4, special effect edit list entries may include an additional parameter to indicate that a special effect is to occur. Alternatively, an edit list incorporating special effects may include a duration parameter so that the special effect may be specified independently of the length of the stream(s) upon which it operates. For example, the edit list entry shown in Table 5 specifies an output stream comprising 10 seconds of stream-1, followed by 1 minute of stream-2, with a single frame of stream-3 (at location 00:00:59:04) fading to black over 2 seconds. In this example, frame 00:00:59:04 of stream-3 may be duplicated in the final output stream to accommodate the 2 second fade to black special effect.

TABLE 4

An Illustrative Edit List With Special Effects

| Input Stream Identification | Start Position | Stop Position | Special Effect |
| --- | --- | --- | --- |
| Stream-1 | 00:00:00:00 | 00:00:15:00 | |
| Stream-1 | 00:00:15:00 | 00:00:16:00 | Dissolve |
| Stream-2 | 00:12:10:00 | 00:12:11:00 | Dissolve |
| Stream-3 | 01:00::00:00 | 01:15::00:00 | |
| Stream-3 | 01:15::00:00 | 01:15::05:00 | Fade |

TABLE 5

An Alternative Edit List With Special Effects

| Input Stream Identifier | Start Position | Stop Position | Special Effect | Duration |
| --- | --- | --- | --- | --- |
| Stream-1 | 00:00:00:00 | 00:00:10:00 | | |
| Stream-2 | 00:01:00:00 | 00:02:00:00 | | |
| Stream-3 | 00:00:59:04 | 00:00:59:04 | Fade | 2 seconds |

Editing techniques in accordance with the invention may provide one or more of the following benefits: reduced edit-time storage requirements (e.g., random access memory and long-term or mass storage memory); improved editing performance and user responsiveness; and automatic post-editing batch processing of user specified edits to generate an output stream (which may be generated to conform to any specified output format).

Various changes in the materials, components as well as in the details of the illustrated operational methods are possible without departing from the scope of the claims. For example, start and stop entries in an edit list may be relative positions within the identified stream rather than absolute locations as used in the illustrative examples of Tables 1 through 5. Furthermore, the methods of FIGS. 2 and 3 and the edit list processor of FIG. 4 may be embodied in a hardware device such as a printed circuit board comprising discrete logic, integrated circuits, or specially designed application specific integrated circuits (ASIC). In addition, the embodiments of FIGS. 2 and 3 may be performed by a programmable control device such as a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

Further, an edit list may be generated that is not in output sequence order (e.g., the order described above with respect to Tables 1 and 2). That is, each edit made by a user may be appended to the end of the edit list as it is made. If this approach is taken, it cannot be assumed that the frames associated with one edit list entry, immediately follow the frames of the immediately previous edit list entry in the output stream. If edit list entries are not kept in output sequence order, each entry may include an additional tag specifying where in the output stream the associated input stream's frames are to be positioned. For efficient processing such an edit list may be sorted, using the output time tag as a key, to place it in output sequence order.

What is claimed is:

1. A method comprising:

receiving a compressed frame of video data;

generating from said compressed frame of video data a command; and video editing said compressed frame of video data based on the command.

2. The method of claim 1, including capturing uncompressed video data.

3. The method of claim 2, including:

processing said uncompressed video data to generate said compressed frame of video data wherein said compressed frame of video data to be of a relatively less data density than that of said uncompressed video data.

4. The method of claim 3, including generating an edit command to transform said uncompressed video data into said compressed frame of video data.

5. The method of claim 4, including editing said compressed frame of video data based on the edit command.

6. The method of claims 4, including decompressing said compressed frame of video data to generate an image stream.

7. The method of claim 2, further including lowering the resolution of said uncompressed video data to enable a frame-based editing thereof.

8. The method of claim 7 including incorporating a sequence of edit commands into said compressed frame of video data to cause said frame-based editing of said uncompressed video data.

9. An apparatus comprising:

an interface to receive an uncompressed digital video signal;

a device operably coupled to said interface to transform the uncompressed digital video signal into a compressed frame of video data; and an editor operably coupled to said device to receive said compressed frame of video data to generate a command therefrom to cause video editing of said compressed frame of video data.

10. The apparatus of claim 9, said interface to capture said uncompressed digital video signal to derive a stream of frame-based video data.

11. The apparatus of claim 9, said editor to process said compressed frame of video data, wherein said compressed frame of video data to be of a relatively less data density than that of said uncompressed digital video signal.

12. The apparatus of claim 11, said device to generate an edit command to transform said compressed frame of video data.

13. The apparatus of claim 12, said editor to perform editing of said compressed frame of video data based on the edit command.

14. The apparatus of claim 13, said editor to decompress said compressed frame of video data to generate an image stream.

15. The apparatus of claim 10, said device to lower the resolution of said uncompressed video data to enable a frame-based editing thereof.

16. The apparatus of claim 15, said editor to incorporate a sequence of edit commands into said compressed frame of video data to cause said frame-based editing of said compressed frame of video data.

17. An article comprising a medium storing instructions that, if executed, enable a processor-based system to perform steps comprising:
   receiving a compressed frame of video data;
   generating from said compressed frame of video data a command; and
   video editing said compressed frame of video data based on the command.

18. The article of claim 17, comprising a medium storing instructions that, if executed, enable a processor-based system to perform steps comprising capturing uncompressed video data.

19. The article of claim 18, comprising a medium storing instructions that, if executed, enable a processor-based system to perform steps comprising:
   processing said uncompressed video data to generate said compressed frame of video data, said compressed frame of video data to be of a relatively less data density than that of said uncompressed video data.

20. The article of claim 17, comprising a medium storing instructions that, if executed, enable a processor-based system to perform steps comprising generating an edit command to transform said compressed frame of video data.

21. The article of claim 17, comprising a medium storing instructions that, if executed, enable a processor-based system to perform steps comprising editing said compressed frame of video data based on the edit command.

22. The article of claim 17, comprising a medium storing instructions that, if executed, enable a processor-based system to perform steps comprising decompressing said compressed frame of video data to generate an image stream.

23. The article of claim 17, comprising a medium storing instructions that, if executed enable a processor-based system to perform steps comprising lowering the resolution of said uncompressed video data to enable a frame-based editing thereof.

24. The article of claim 23, comprising a medium storing instructions that, if executed, enable a processor-based system to perform steps comprising incorporating a sequence of edit commands into said compressed frame of video data to cause said frame-based editing of said uncompressed video data.

25. An image editing device comprising:
   an interface to receive an uncompressed digital video signal;
   a device operably coupled to said interface to transform the uncompressed digital video signal into a compressed frame of video data; and
   an editor operably coupled to said device to receive said compressed frame of video data to generate a command therefrom to cause video editing of said compressed frame of video data.

26. The image editing device of claim 25, said interface to capture said uncompressed digital video signal to derive a stream of frame-based video data.

27. The image editing device of claim 25, said editor to process said compressed frame of video data, wherein said compressed frame of video data to be of a relatively less data density than that of said uncompressed digital video signal.

28. The image editing device of claim 27, said device to generate an edit command to transform said compressed frame of video data.

29. A processor-based system comprising:
   an interface to receive an uncompressed digital video signal;
   a device operably coupled to said interface to transform the uncompressed digital video signal into a compressed frame of video data; and
   an editor operably coupled to said device to receive said compressed frame of video data to generate a command therefrom to cause video editing of said compressed frame of video data.

30. The processor-based system of claim 29, said interface to capture said uncompressed digital video signal to derive a stream of frame-based video data.

31. The processor-based system of claim 29, said editor to process said compressed frame of video data, said compressed frame of video data to be of a relatively less data density than that of said uncompressed digital video signal.

32. The processor-based system of claim 31, said device to generate an edit command to transform said compressed frame of video data.

* * * * *